US006981636B2

(12) United States Patent
Gallo-Hendrikx

(10) Patent No.: US 6,981,636 B2
(45) Date of Patent: Jan. 3, 2006

(54) DOCUMENT PATH SELECTOR APPARATUS FOR USE IN A SELF-SERVICE TERMINAL

(75) Inventor: Dale Edward Gallo-Hendrikx, Fergus (CA)

(73) Assignee: NCR Corporation, Dayton, OH (US)

( * ) Notice: Subject to any disclaimer, the term of this patent is extended or adjusted under 35 U.S.C. 154(b) by 194 days.

(21) Appl. No.: 10/325,345

(22) Filed: Dec. 19, 2002

(65) Prior Publication Data

US 2004/0118910 A1 Jun. 24, 2004

(51) Int. Cl.
*G06F 17/60* (2006.01)

(52) U.S. Cl. ........................................ 235/379; 271/303
(58) Field of Classification Search ................. 235/379, 235/380; 705/16; 271/3.14, 298, 303; 209/534
See application file for complete search history.

(56) References Cited

U.S. PATENT DOCUMENTS

| | | | | | |
|---|---|---|---|---|---|
| 3,189,342 | A | | 6/1965 | Bocock | |
| 4,277,061 | A | | 7/1981 | Nagel et al. | |
| 4,486,015 | A | | 12/1984 | Takahashi | |
| 4,494,743 | A | * | 1/1985 | Kushmaul et al. | 271/11 |
| 5,150,894 | A | * | 9/1992 | Ricciardi | 271/302 |
| 5,570,877 | A | | 11/1996 | Asami et al. | |
| 5,788,227 | A | * | 8/1998 | Hendrix et al. | 271/3.2 |
| 5,959,288 | A | * | 9/1999 | Tajiri et al. | 235/475 |
| 6,273,413 | B1 | * | 8/2001 | Graef | 271/3.14 |
| 6,398,212 | B1 | * | 6/2002 | Miyake | 271/186 |
| 6,494,364 | B2 | * | 12/2002 | Shepherd | 235/379 |
| 6,547,132 | B1 | * | 4/2003 | Templeton et al. | 235/380 |
| 2002/0109290 | A1 | * | 8/2002 | Wurschum | 271/303 |

FOREIGN PATENT DOCUMENTS

| | | |
|---|---|---|
| EP | 0 332 873 A | 9/1989 |
| EP | 0 915 436 A | 5/1999 |

* cited by examiner

*Primary Examiner*—Diane I. Lee
*Assistant Examiner*—Lisa M. Caputo
(74) *Attorney, Agent, or Firm*—Michael Chan

(57) ABSTRACT

A self-service terminal includes a fascia having a document slot, and a document processing module. The document processing module includes a document path selector mechanism disposed along a bi-directional document transport path which extends between the document slot and a document processing zone. The document path selector mechanism enables a document to be transported along the document transport path between the document slot and the document processing zone when parts of the document path selector mechanism are in a first position. The document path selector mechanism enables a document to be transported along a divert path extending from the document processing zone to a location other than the document slot when parts of the document path selector mechanism are in a second position.

14 Claims, 7 Drawing Sheets

DOCUMENT PATH SELECTOR APPARATUS FOR USE IN A SELF-SERVICE TERMINAL

BACKGROUND OF THE INVENTION

The present invention relates to a self-service terminal, and is particularly directed to a document path selector apparatus for use in a self-service terminal, such as a cheque cashing ATM.

A cheque cashing ATM allows a registered user, who typically does not have a bank account, to cash a cheque and receive money from the ATM in a public access, unattended environment. A user typically registers with an institution that owns or operates cheque cashing ATMs, and provides identification information (such as a social security number) and information about a cheque (usually a pay cheque) that he/she regularly receives. The registered user is typically provided with a card to initiate a cheque cashing transaction at a cheque cashing ATM. The cheque information typically includes details of how frequently a cheque is paid (for example, every week), who the cheque is paid by (that is, the payor of the cheque), the payor's bank details (for example, a bank code identifying the name of the bank), the typical amount that the cheque is made out for, and such like.

To cash a cheque, a user enters his/her card at a cheque cashing ATM, then enters a cheque to be cashed through a cheque slot in the ATM's fascia. A cheque transport mechanism receives the entered cheque and transports the cheque in a forward direction along a cheque transport path to a number of locations within the ATM to process this cheque. If the cheque is valid, and the details printed on the cheque match the cheque information provided during registration, then the ATM informs the user of a surcharge that will be applied if the user wishes to cash the cheque. If the user does not agree to the surcharge, then the cheque is returned in the reverse direction along the cheque transport path to the user via the cheque slot. If the user agrees to the surcharge, then cash is dispensed to the user and the cheque is transported to and stored in a storage bin within the ATM. Since space within the ATM is limited, it would be desirable to provide a cheque transport mechanism which is relatively compact in design, and which is capable of returning a cheque to a user when needed and transporting a cheque to the storage bin within the ATM when needed.

SUMMARY OF THE INVENTION

In accordance with one aspect of the invention, a self-service terminal comprises a fascia including means defining a document slot, and a document processing module including means defining a document processing zone, means defining a bi-directional document transport path which extends between the document slot and the document processing zone, and a document path selector mechanism disposed along the document transport path. The document path selector mechanism is provided for (i) enabling a document to be transported along the document transport path between the document slot and the document processing zone when parts of the document path selector mechanism are in a first position, and (ii) enabling a document to be transported along a divert path extending from the document processing zone to a location other than the document slot when parts of the document path selector mechanism are in a second position.

Preferably, the document path selector mechanism includes first and second movable deflector members and a movable selector member disposed between the first and second deflector members such that (i) the selector member and the first deflector member co-operate to define at least a portion of the document transport path extending between the document slot and the document processing zone when parts are in the first position, and (ii) the selector member and the second deflector member co-operate to define the divert path extending from the document processing zone to the location other than the document slot when parts are in the second position. The document path selector mechanism includes a linking member for linking the first and second deflector members such that the first and second deflector members move together as a unit when parts of the document path selector mechanism switch between the first and second positions. The first deflector member includes a stopping surface for engaging a deflector stop to limit the extent of movement of the first deflector member when parts are in the first position. The second deflector member includes a stopping surface for engaging a deflector stop to limit the extent of movement of the second deflector member when parts are in the second position. The selector member is separable apart from between the first and second deflector members to allow a document which is jammed between the selector member and one of the first and second deflector members to be removed. The document processing module may include a MICR reader disposed along the document transport path.

In accordance with another aspect of the invention, an automated teller machine (ATM) comprises an ATM fascia including (i) means defining a currency dispensing slot through which currency can be dispensed to an ATM customer, and (ii) means defining a cheque entrance/exit slot. The ATM also comprises a currency dispensing module for dispensing currency via the currency dispensing slot to an ATM customer. The ATM further comprises a cheque processing module for receiving a cheque from an ATM customer. The cheque processing module includes means defining a cheque processing zone, means defining a bi-directional cheque transport path which extends between the cheque entrance/exit slot and the cheque processing zone, and a cheque path selector mechanism disposed along the cheque transport path. The cheque path selector mechanism is provided for (i) enabling a cheque to be transported along the cheque transport path between the cheque entrance/exit slot and the cheque processing zone when parts of the cheque path selector mechanism are in a first position, and (ii) enabling a cheque to be transported along a divert path extending from the cheque processing zone to a location other than the cheque entrance/exit slot when parts of the cheque path selector mechanism are in a second position. The cheque path selector mechanism includes first and second movable deflector members and a movable selector member disposed between the first and second deflector members such that (i) the selector member and the first deflector member co-operate to define at least a portion of the cheque transport path extending between the cheque entrance/exit slot and the cheque processing zone when parts are in the first position, and (ii) the selector member and the second deflector member co-operate to define the divert path extending from the cheque processing zone to the location other than the cheque entrance/exit slot when parts are in the second position.

Preferably, the cheque path selector mechanism includes a linking member for linking the first and second deflector members such that the first and second deflector members move together as a unit when parts of the cheque path selector mechanism switch between the first and second positions. The first deflector member includes a stopping surface for engaging a deflector stop to limit the extent of movement of the first deflector member when parts are in the first position. The second deflector member includes a stopping surface for engaging a deflector stop to limit the extent of movement of the second deflector member when parts are in the second position. The selector member is separable apart from between the first and second deflector members to allow a cheque which is jammed between the selector member and one of the first and second deflector members to be removed. The cheque processing module may include a MICR reader disposed along the cheque transport path.

In accordance with yet another aspect of the invention, a document path selector apparatus is provided for use in a self-service terminal. The apparatus comprises first and second movable deflector members. The apparatus further comprises a movable selector member disposed between the first and second deflector members and movable between the first and second deflector members such that the selector member and the first deflector member co-operate to define at least a portion of a first document transport path of the self-service terminal when the selector member and the first deflector member are moved to a first position and the selector member and the second deflector member co-operate to define at least a portion of a second document transport path of the self-service terminal when the selector member and the second deflector member are in a second position which is different from the first position.

Preferably, a linking member links the first and second deflector members such that the first and second deflector members move together as a unit when the selector member switches between the first and second positions. The first deflector member includes a stopping surface for engaging a deflector stop to limit the extent of movement of the first deflector member when the selector member and the first deflector member are in the first position. The second deflector member includes a stopping surface for engaging a deflector stop to limit the extent of movement of the second deflector member when the selector member and the second deflector member are in the second position. The selector member is separable apart from between the first and second deflector members to allow a document which is jammed between the selector member and one of the first and second deflector members to be removed.

BRIEF DESCRIPTION OF THE DRAWINGS

These and other aspects of the present invention will be apparent from the following specific description, given by way of example, with reference to the accompanying drawings, in which.

DETAILS OF THE INVENTION

Figure 1:
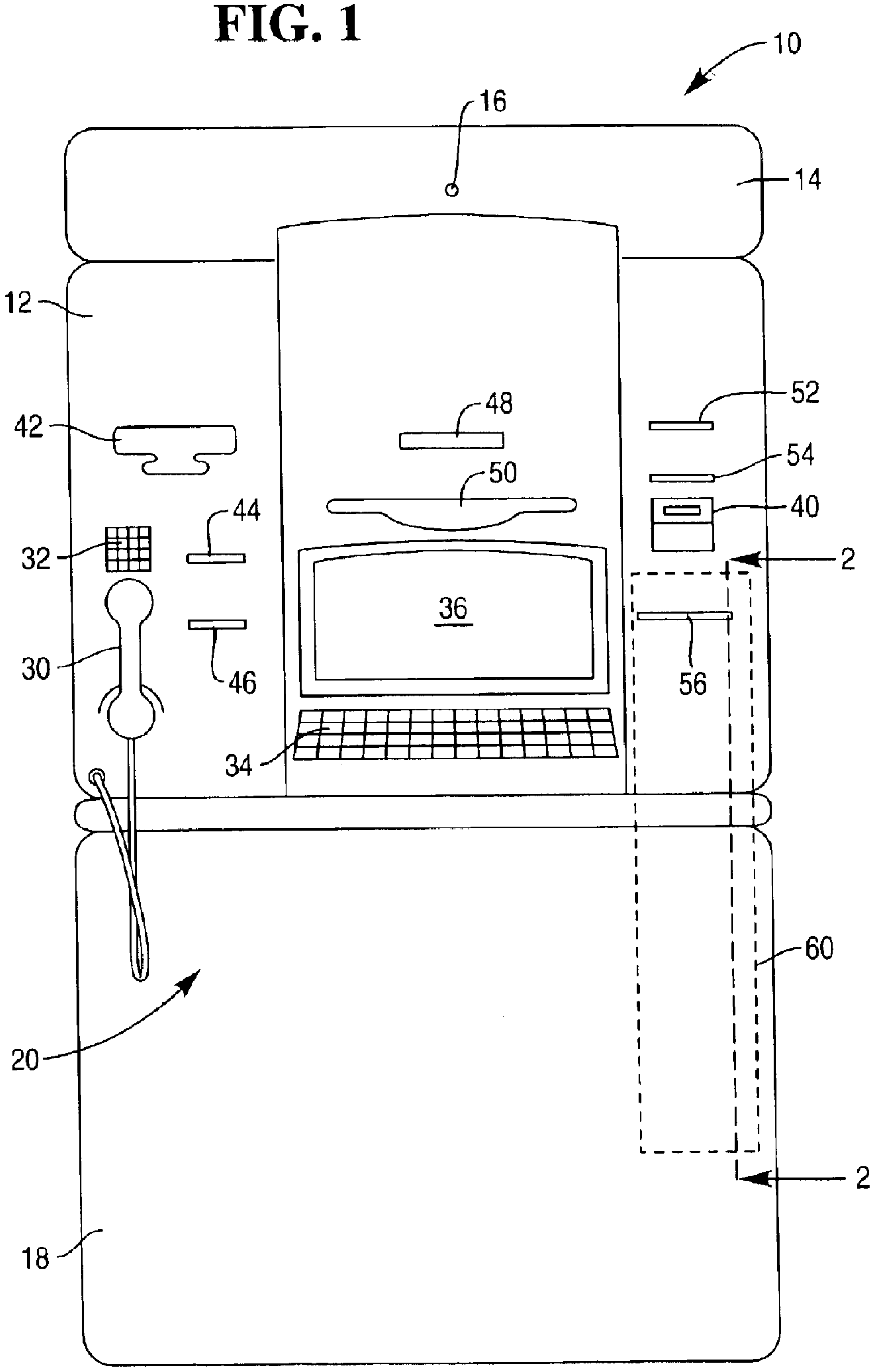
FIG. 1 is a pictorial diagram of a cheque cashing ATM embodying the present invention.

Reference is first made to FIG. 1, which illustrates a self-service terminal 10 in the form of a cheque cashing ATM. The ATM 10 comprises a fascia 12 pivotably coupled to a chassis (not shown); an upper panel 14 mounted to the chassis and defining an aperture 16 through which a camera (not shown) images a user of the ATM 10; and a lower panel 18 hingeably coupled to the chassis (not shown) so that the lower panel 18 can be opened to reveal a safe (not shown) mounted in the chassis (not shown). When the lower panel 18 is open, the fascia 12 can be pivoted upwards to reveal ATM modules mounted within the chassis (not shown).

The fascia 12 and lower panel 18 provide a user interface 20 for allowing a user to execute a transaction. The fascia 12 includes a handset 30 and a telephone keypad 32 for allowing a user to contact a remote operator (not shown) typically located in a call centre (not shown). The fascia 12 also includes an encrypting keyboard 34 for allowing a user to enter transaction details, and a display 36 for presenting screens to a user. The fascia 12 also defines eight slots for receiving and dispensing media items, and a tray 40 into which coins can be dispensed. The slots include: a money order printer slot 42, a bunch note input slot 44, a bunch note exit slot 46, a statement output slot 48, a cash dispense slot 50, a card reader slot 52, a card issue slot 54, and a cheque input/output slot 56. The slots 42 to 56 and tray 40 are arranged so that when the fascia 12 is closed, the slots and tray align with corresponding ATM modules mounted within the ATM's chassis (not shown). The user interface features described above are all provided on an NCR PERSONAS (trade mark) 5878 financial services centre ATM, available from NCR Financial Solutions Group Limited, Discovery Centre, 3 Fulton Road, Dundee, DD2 4SW, Scotland.

Figure 2:
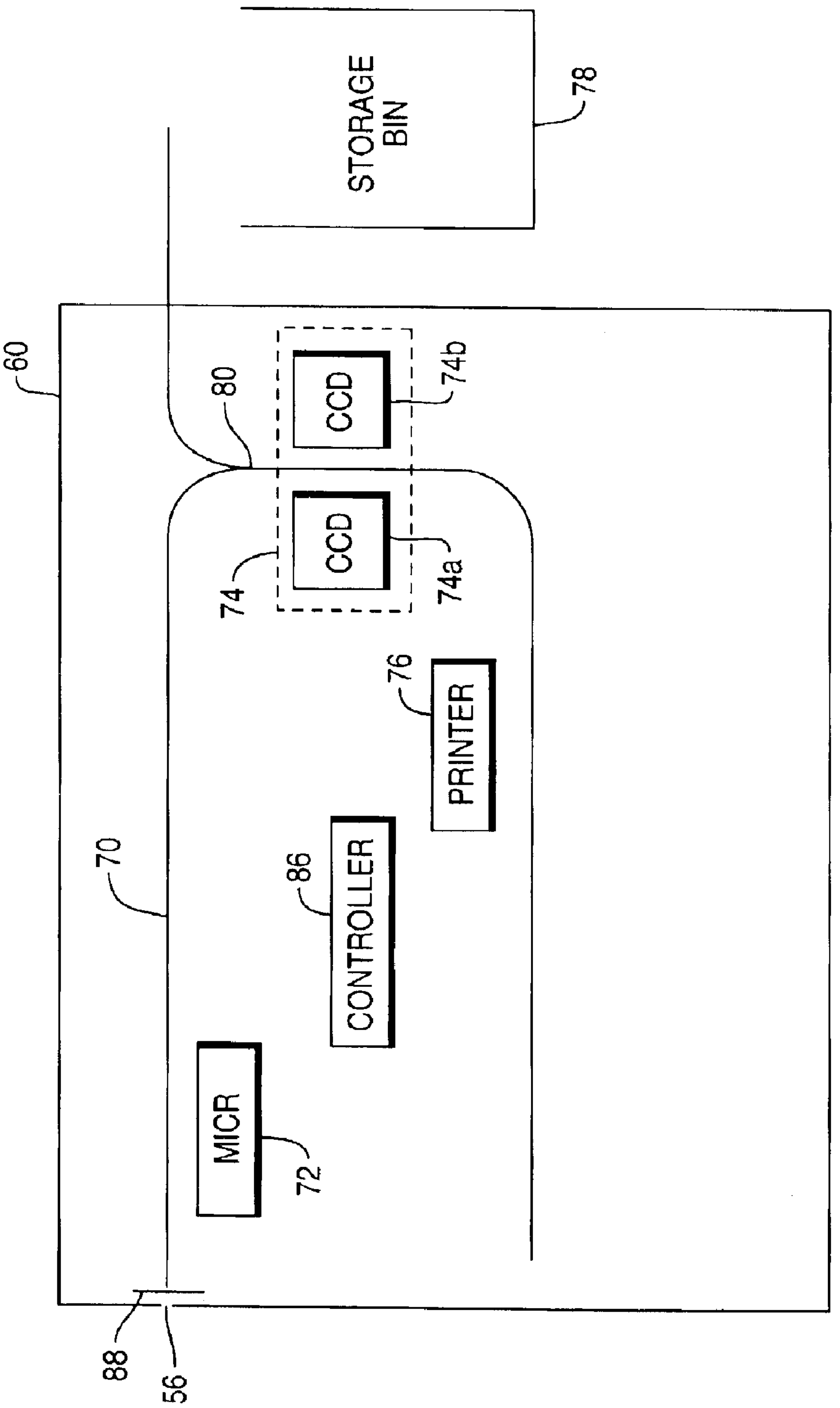
FIG. 2 is a simplified schematic sectional diagram, taken approximately along line 2—2 in FIG. 1, and showing a part (the cheque processing module) of the ATM of FIG. 1.
Figure 3:
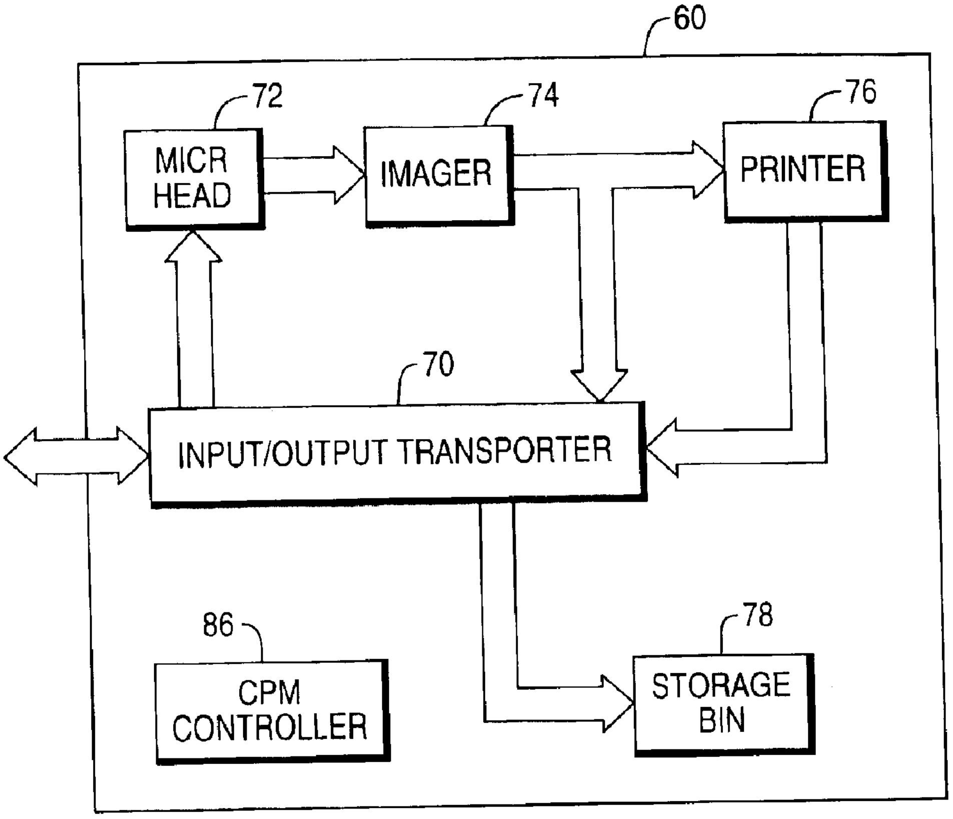
FIG. 3 is a block diagram of the cheque processing module of FIG. 2.

A cheque processing module (CPM) 60 will now be described with reference to FIG. 2 and FIG. 3. FIG. 2 is a simplified schematic sectional diagram (along line 2—2 in FIG. 1) showing part of the fascia 12 and lower panel 18, and the main parts of the CPM 60. FIG. 3 is a block diagram illustrating the main elements in the CPM 60. The CPM 60 is a modified version of a conventional cheque processing module, such as the cheque processing module provided with the PERSONAS (trade mark) 5878 NCR ATM.

The CPM 60 comprises the following elements: a cheque input/output transport mechanism 70 including an alignment mechanism for aligning a cheque; a MICR head 72 for reading magnetic details on a code line of a cheque; an imager 74 including an upper 74*a* and lower 74*b* CCD camera for capturing an image of each side of a cheque (front and rear); a printer 76 for endorsing a cheque; and a storage bin 78 for storing processed cheques. The elements are conventional and will not be described in detail herein. The CPM 60 also includes a controller 86 for controlling the operation of the elements within the CPM 60. The CPM 60 also includes an entrance shutter 88 for opening and closing the cheque input/output slot 56.

Figure 4:
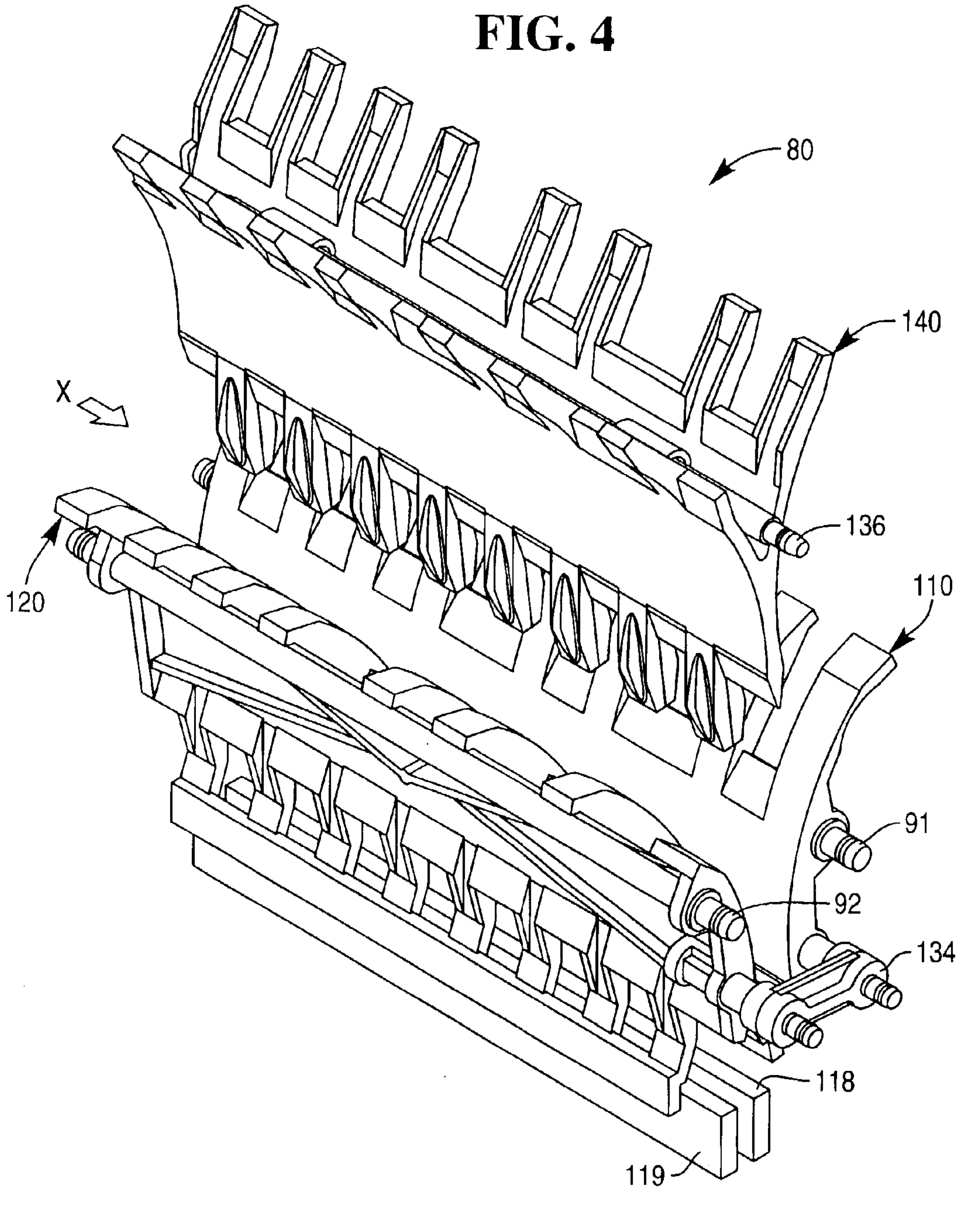
FIG. 4 is an exploded pictorial view of a part (the document path selector) of the ATM of FIG. 1.
Figure 5:
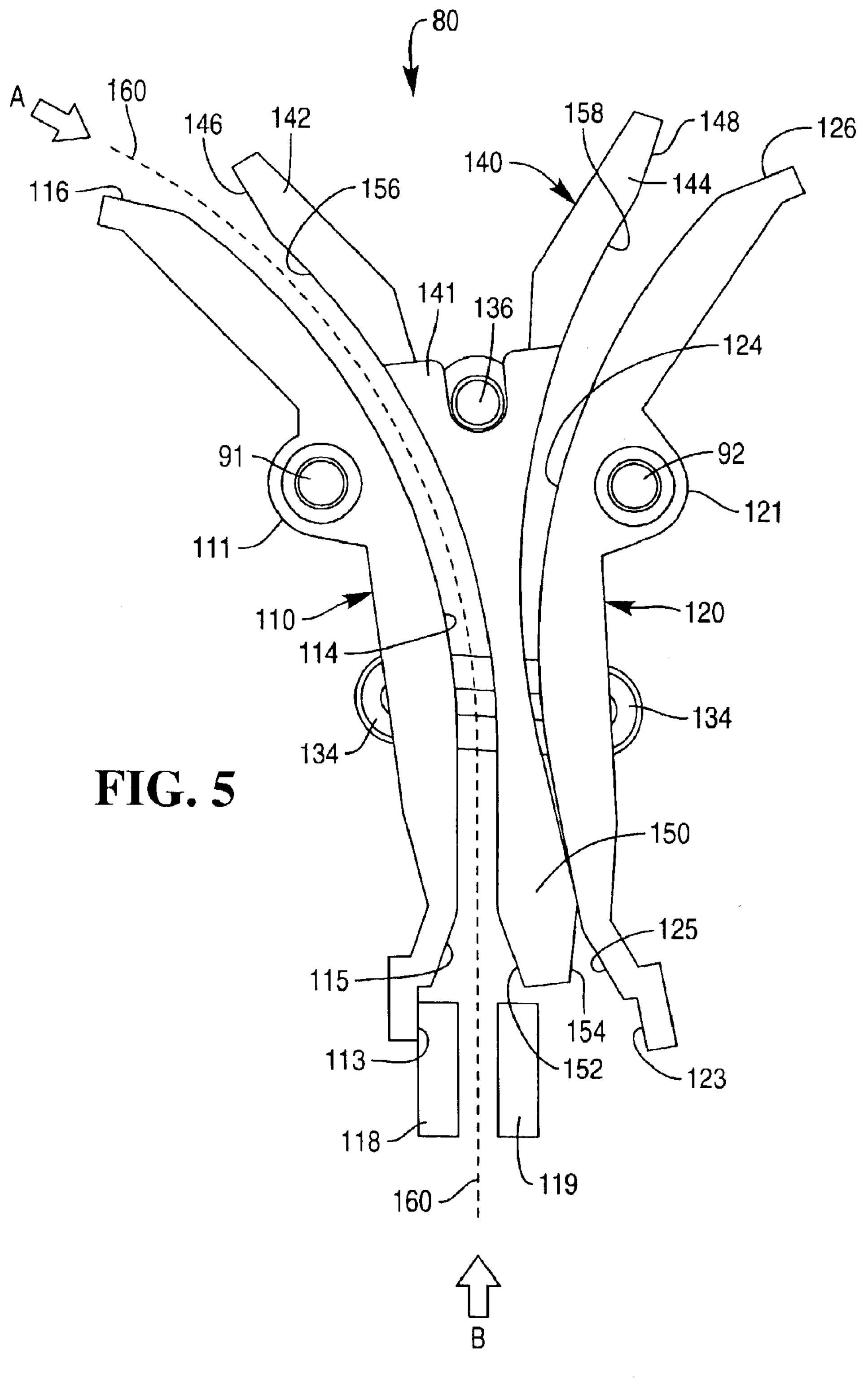
FIG. 5 is an end view of the document path selector of FIG. 4, looking in the direction of arrow X of FIG. 4, and showing parts in a first position.

The CPM 60 further includes a divert gate 80 is in the form of a document path selector mechanism. Referring to FIGS. 4 and 5, the selector mechanism 80 includes a first deflector member 110 having a central portion 111 which is pivotable about a first pivot shaft 91. The first pivot shaft 91 is connected to a frame part (not shown) of the CPM 60. The first deflector 110 includes an end portion having a stopping surface 113 engageable with a first deflector stop 118 to limit extent of movement of the first deflector 110, and an opposite end portion having a tapered surface 116. The first deflector 110 also includes a curved major surface 114 and a tapered surface 115 which interconnects the stopping surface 113 and the curved major surface 114. The curved major surface 114 interconnects the tapered surface 115 and the tapered surface 116.

Similarly, the selector mechanism 80 includes a second deflector member 120 having a central portion 121 which is pivotable about a second pivot shaft 92. The second pivot shaft 92 is connected to the same frame part (not shown) to which the first pivot shaft 91 is connected. The second deflector 120 includes an end portion having a stopping surface 123 engageable with a second deflector stop 119 to limit extent of movement of the second deflector 120, and an opposite end portion having a tapered surface 126. The second deflector 120 also includes a curved major surface 124 and a tapered surface 125 which interconnects the stopping surface 123 and the curved major surface 124. The curved major surface 124 interconnects the tapered surface 125 and the tapered surface 126. A linking member 134 interconnects the first and second deflectors 110, 120.

The selector mechanism 80 further includes a selector member 140 having a central portion 141 which is pivotable about a selector shaft 136. The selector shaft 136 is connected to another frame part (also not shown) of the CPM 60. The frame part to which the selector shaft 136 is connected is different from and separable away from the frame part to which the first and second pivot shafts 91, 92 of the first and second deflectors 110, 120 are connected. Thus, the selector 140 is movable away from the first and second deflectors 110, 120, as shown in FIG. 4. This allows a cheque that is jammed between the selector 140 and at least one of the first and second deflectors to be easily removed to clear the jam condition.

The selector 140 includes first and second end portions 142, 144 and end portion 150 which lies opposite the first and second end portions 142, 144. The end portion 150 has a tapered surface 152 which faces the tapered surface 115 of the first deflector 110 and a tapered surface 154 which faces the tapered surface 125 of the second deflector 120. The first end portion 142 has a tapered surface 146 which faces the tapered surface 116 of the first deflector 110, and the second end portion 144 has a tapered surface 148 which faces the tapered surface 126 of the second deflector 120. A first curved major surface 156 interconnects the tapered surface 146 and the tapered surface 152. Similarly, a second curved major surface 158 interconnects the tapered surface 148 and the tapered surface 154.

The parts of the document path selector mechanism 80 are shown in FIG. 5 in a first position. When parts are in the first position shown in FIG. 5, a continuous document transport path 160 is formed between the major surface 114 of the first deflector 110 and the major surface 156 of the selector 140. The continuous path 160 forms a portion of the document transport path which extends between the cheque entrance/exit slot 56 and the zone in the vicinity of the endorser printer 76 (FIG. 1).

When a cheque is transported from the slot 56 to the printer 76, the cheque moves along the document transport path including the path 160 in the direction of arrow A as shown in FIG. 5. The tapered surface 116 and the tapered surface 146 co-operate to minimize the chance of the cheque becoming jammed as the cheque initially enters into the path 160 in the direction of arrow A. Similarly, when a cheque is transported from the printer 76 to the slot 56, the cheque moves along the document transport path including the path 160 in the direction of arrow B as shown in FIG. 5. The tapered surface 115 of the first deflector 110 and the tapered surface 152 of the selector 140 co-operate to minimize the chance of the cheque becoming jammed as the cheque initially enters into the path 160 in the direction of arrow B.

Figure 6:
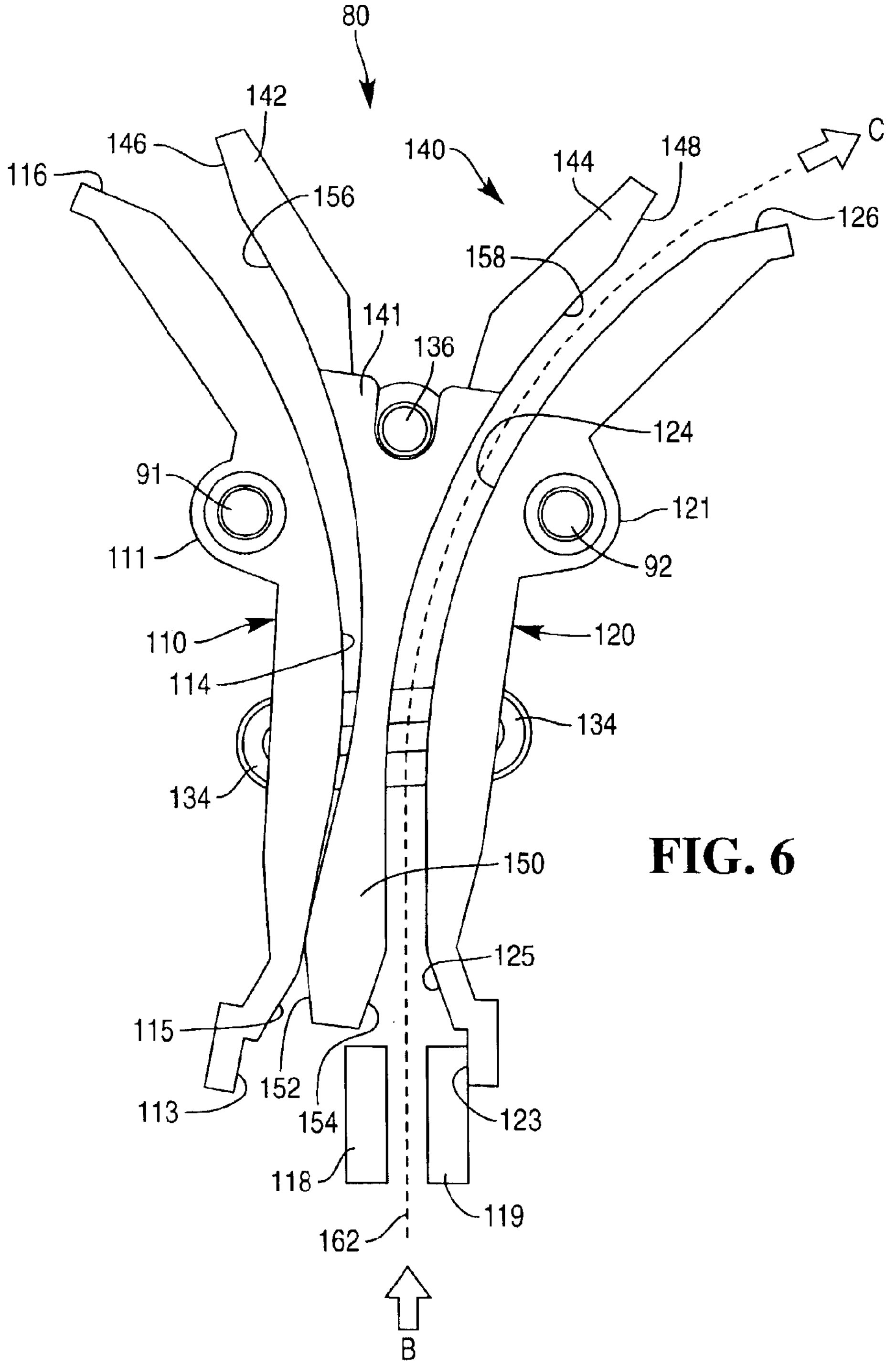
FIG. 6 is a view similar to FIG. 5 and showing parts in a second position.

When a cheque in the zone of the printer 76 and the controller 86 (FIG. 1) makes a determination that the cheque is to be transported into the storage bin 78, the controller 86 commands an actuator (not shown) which pivots the selector 140 about the selector shaft 136 in a clockwise direction (as viewed looking at FIG. 5) to move the parts from the first position shown in FIG. 5 to the second position shown in FIG. 6. When the selector 140 pivots clockwise about the selector shaft 136, the end portion of the curved major surface 156 in the vicinity of the tapered surface 152 moves against an end portion of the curved major surface 114 in the vicinity of the tapered surface 115 of the first deflector 110.

As the selector 140 continues to rotate clockwise about the selector shaft 136 from the position shown in FIG. 5 to the position shown in FIG. 6, the first deflector 110 pivots clockwise about the first deflector shaft 91. Since the first and second deflectors 110, 120 are interconnected by the linkage 134, the second deflector 120 rotates clockwise about the second deflector shaft 92 when the first deflector 110 rotates about the first shaft 91. When parts of the selector mechanism 80 are in the position as shown in FIG. 6, a continuous divert path 162 is formed between the major surface 124 of the second deflector 120 and the major surface 158 of the selector 140. The divert path 162 extends from a portion the document transport path which extends from the zone in the vicinity of the endorser printer 76. When a cheque is transported from the zone in the vicinity of the printer 76, the cheque enters the divert path 162 in the direction of arrow B as shown in FIG. 6. The tapered surface 125 of the second deflector 120 and the tapered surface 154 of the selector 140 co-operate to minimize the chance of the cheque becoming jammed as the cheque initially enters into divert path 162. As the cheque is transported along the divert path 162 in the direction of arrow B in FIG. 6, the cheque eventually leaves the end of the divert path 162 (shown as arrow C in FIG. 6) where the tapered surface 126 of the second deflector 120 faces the tapered surface 148 of the selector 140 and goes into the storage bin 78. Although the storage bin 78 is shown located outside of the CPM 60, it is contemplated that the storage bin may be located inside the CPM.

After the cheque has been diverted into the storage bin 78, the controller 86 commands the actuator to rotate the selector 140 about the selector shaft 136 in a counter-clockwise direction (as viewed looking at FIG. 6) to move the parts from the position shown in FIG. 6 back to the position shown in FIG. 5. When the selector 140 pivots counter-clockwise about the selector shaft 136, the end portion of the curved major surface 158 in the vicinity of the tapered surface 154 moves against an end portion of the curved major surface 124 in the vicinity of the tapered surface 125 of the second deflector 120.

As the selector 140 continues to rotate counter-clockwise about the selector shaft 136, the second deflector 120 pivots counter-clockwise about the second deflector shaft 92. Since the first and second deflectors 110, 120 are interconnected by the linkage 134, the first deflector 110 rotates counter-clockwise about the first deflector shaft 91 when the second deflector 110 rotates about the second shaft 92. When parts of the selector mechanism 80 are returned back to the position as shown in FIG. 5, the continuous path 160 is again formed between the curved major surface 114 of the first deflector 110 and the curved major surface 156 of the selector 140.

Figure 7:
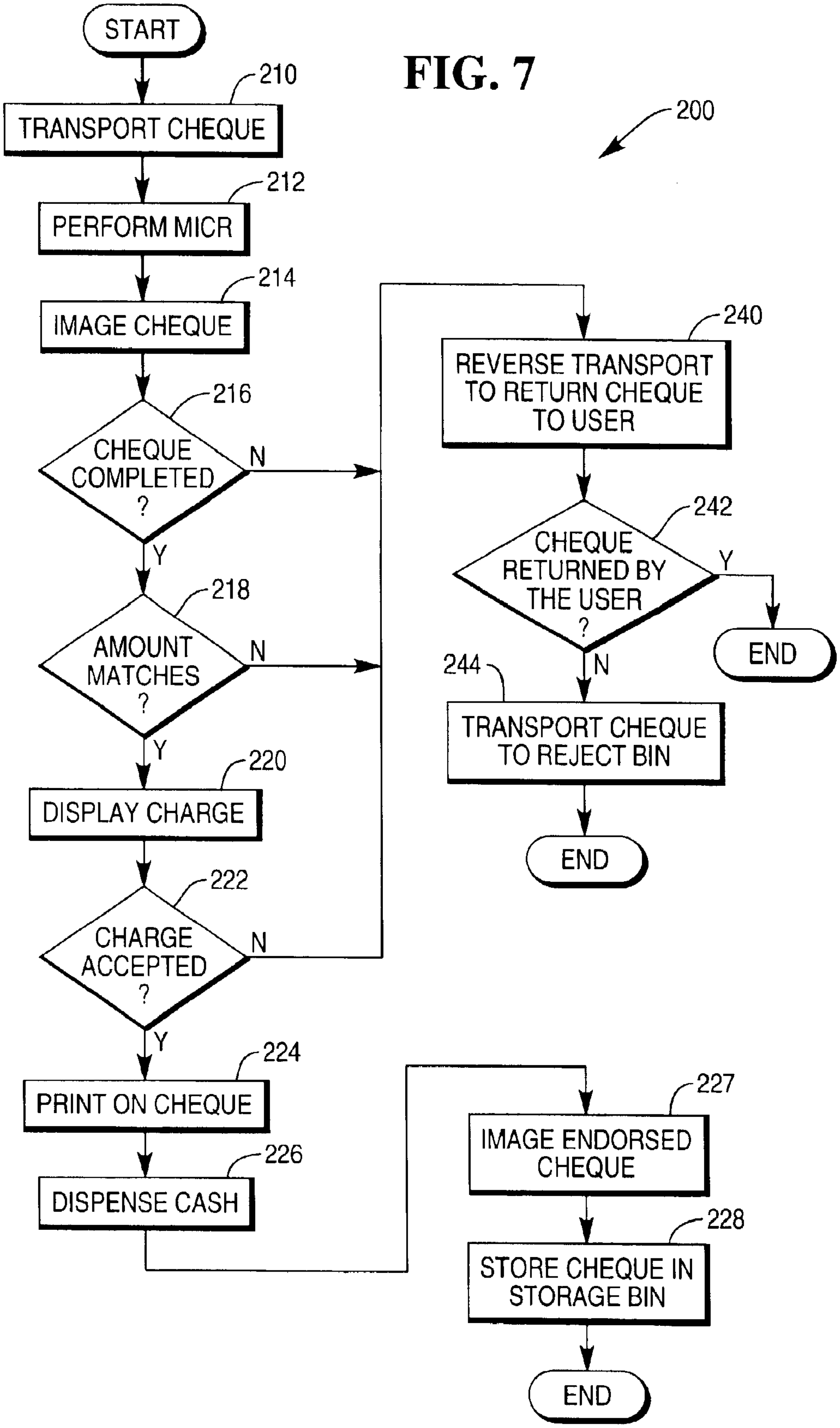
FIG. 7 is a flowchart illustrating the steps involved in a cheque cashing operation.

A typical transaction will now be described with reference to FIG. 7 which is a flowchart 200 illustrating the steps involved in a cheque cashing transaction, and also with reference to FIGS. 1 to 3. In this transaction, a user has registered with an institution owning and operating the ATM 10, and the user has informed the institution that he receives a weekly pay cheque for two hundred dollars, and has received a registration card for accessing cheque cashing functions at the ATM 10. Initially, the user enters the registration card into the card reader slot 52, selects “cheque cashing” from a list of transaction options presented on the display 36, and inserts the cheque to be cashed through the cheque input/output slot 56. The controller 86 opens the slot shutter 88 to receive the cheque, and the transport mechanism 70 transports the received cheque (step 210) to the MICR head 72 where a code line on the cheque is read (step 212). The transport mechanism 70 then transports the cheque to the imager 74, where both sides of the cheque are imaged (step 214).

The controller 86 then verifies that the cheque has been completed correctly (step 216). If the cheque is incomplete, then the controller 86 initiates a cheque return operation, described below. If the cheque is complete, then the controller 86 verifies that the amount printed in a courtesy amount field on the cheque matches details provided by the user when the user registered with the institution operating the cheque cashing ATM 10 (step 218). In this example, the user registered a two hundred dollars cheque that was received weekly, and the cheque being presented is made out for two hundred dollars. If the amounts do not match, then the controller 86 initiates a cheque return operation, described hereinbelow. If the amounts do match, as in this example, then the display 36 displays the charge that will be deducted for cashing the cheque (step 220), in this example five dollars, and requests the user to confirm that he is willing to pay this charge to cash the cheque (step 222).

If the user accepts the charge, then the printer 76 prints endorsement data onto the cheque (step 224), and cash is dispensed through the cash dispense slot 50 to the user (step 226). The cash is to the value of the courtesy amount of the cheque minus the charge levied for cashing the cheque, in this example, one hundred and ninety five dollars. The cheque is then transported to the imager 74 to image the endorsed cheque (step 227) before it is transported to the storage bin 78 (step 228) for subsequent collection and further processing. If the user does not wish to pay the charge, then the controller 86 initiates a cheque return operation.

When a cheque return operation is initiated, the transport mechanism 70 reverses the direction of transport (step 240) to convey the cheque to the cheque input/output slot 56 to return the cheque to the user via the cheque input/output slot. The controller 86 may monitor the slot 56 to ensure that the cheque has been removed by the user (step 242). If the user has not removed the cheque within a predetermined time period, the cheque is retracted and conveyed to a reject bin (not shown) (step 244).

Although the above-description describes a cheque being cashed in its entire amount by an ATM customer, it is contemplated that the cheque may be cashed only in partial amount of the entire amount of the cheque at the ATM 10, with the remaining amount of the cheque being deposited to a banking account. It is also conceivable that the entire amount of the cheque be deposited by an ATM customer into a banking account.

A number of advantages result by providing the document path selector mechanism 80 in accordance with the present invention. One advantage is that the construction of the selector mechanism 80 is relatively compact and, therefore occupies relatively less space within the ATM. Another advantage is that the selector mechanism 80 is operable requiring minimal movement of its parts. This provides additional compactness. Still another advantage is that the selector 140 can be easily separated apart from the first and second deflectors 110, 120 to allow a jammed cheque to be quickly and easily removed when a jam condition occurs.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A self-service terminal for use in an unattended environment to allow a self-service user to conduct a self-service transaction, the self-service terminal comprising:

a fascia including means defining a document slot;

means defining a document storage bin; and a document processing module including means defining a document processing zone, means defining a first document transport path which extends between the document slot and the document processing zone, means defining a second document transport path which is different from the first document transport path and which extends between the document processing zone and the document storage bin, and a document path selector mechanism disposed along at least one of the first and second document transport paths for (i) enabling a document to be transported along the first document transport path between the document slot and the document processing zone when parts of the document path selector mechanism are in a first position, and (ii) enabling a document to be transported along the second document transport path from the document processing zone to the document storage bin when parts of the document path selector mechanism are in a second position which is different from the first position;

the document path selector mechanism including first and second movable deflector members and a movable selector member disposed between the first and second deflector members, wherein (i) each of the first and second deflector members has a major surface, (ii) the selector member has a first major surface which faces towards the major surface of the first deflector member to define at least a portion of the first document transport path extending between the document slot and the document processing zone when parts are in the first position, and (iii) the selector member has a second major surface which is different from the first major surface and which faces towards the major surface of the second deflector member to define at least a portion of the second document transport path extending between the document processing zone and the document storage bin when parts are in the second position.

2. A self-service terminal according to claim 1, wherein the document path selector mechanism includes a linking member for linking the first and second deflector members such that the first and second deflector members move together as a unit when parts of the document path selector mechanism switch between the first and second positions.

3. A self-service terminal according to claim 1, wherein the selector member is separable apart from between the first and second deflector members to allow a document which is jammed between the selector member and one of the first and second deflector members to be removed.

4. A self-service terminal according to claim 1, wherein the document processing module includes a magnetic ink character recognition (MICR) reader disposed along the first document transport path.

5. A cheque cashing automated teller machine (ATM) for enabling an ATM customer to conduct a cheque deposit transaction, the cheque cashing ATM comprising:

an ATM fascia including (i) means defining a currency dispensing slot through which currency can be dispensed to an ATM customer, and (ii) means defining a cheque entrance/exit slot;

a currency dispensing module for dispensing currency via the currency dispensing slot to an ATM customer;

a cheque storage bin for storing cheques deposited by ATM customers;

a cheque processing module for receiving a cheque from an ATM customer, the cheque processing module including means defining a cheque processing zone, means defining a bi-directional cheque transport path which extends between the cheque entrance/exit slot and the cheque processing zone, means defining a divert cheque transport path which is different from the bi-directional cheque transport path and which extends between the cheque processing zone and the cheque storage bin, and a cheque path selector mechanism disposed along at least one of the cheque transport paths for (i) enabling a cheque to be transported along the bi-directional cheque transport path between the cheque entrance/exit slot and the cheque processing zone when parts of the cheque path selector mechanism are in a first position, and (ii) enabling a cheque to be transported along the divert cheque transport path from the cheque processing zone to the cheque storage bin when parts of the cheque path selector mechanism are in a second position which is different from the first position;

the cheque path selector mechanism including first and second movable deflector members and a movable selector member disposed between the first and second deflector members, wherein (i) each of the first and second deflector members has a major surface, (ii) the selector member has a first major surface which faces towards the major surface of the first deflector member to define at least a portion of the bi-directional cheque transport path extending between the cheque entrance/exit slot and the cheque processing zone when parts are in the first position, and (iii) the selector member has a second major surface which is different from the first major surface and which faces towards the major surface of the second deflector member to define at least a portion of the divert cheque transport path extending between the cheque processing zone and the cheque storage bin when parts are in the second position; and a controller for controlling the currency dispensing module to dispense currency via the currency dispensing slot to an ATM customer when a cheque which has been deposited by the ATM customer is transported along the divert cheque transport path from the cheque processing zone to the cheque storage bin.

6. A cheque cashing ATM according to claim 5, wherein the cheque path selector mechanism includes a linking member for linking the first and second deflector members such that the first and second deflector members move together as a unit when parts of the cheque path selector mechanism switch between the first and second positions.

7. A cheque cashing ATM according to claim 5, wherein the selector member is separable apart from between the first and second deflector members to allow a cheque which is jammed between the selector member and one of the first and second deflector members to be removed.

8. A cheque cashing ATM according to claim 5, wherein the cheque processing module includes a magnetic ink character recognition (MICR) reader disposed along the bi-directional cheque transport path.

9. A document transport path selector apparatus for use in a self-service terminal at which a self-service user can deposit a document to conduct a self-service transaction, the document transport path selector apparatus comprising:

first and second movable deflector members; and a movable selector member disposed between the first and second deflector members and movable between the first and second deflector members, wherein (i) each of the first and second deflector members has a major surface, (ii) the selector member has a first major surface which faces towards the major surface of the first deflector member to define at least a portion of a first document transport path of the self-service terminal when the selector member and the first deflector member are moved to a first position, and (iii) the selector member has a second major surface which is different from the first major surface and which faces towards the major surface of the second deflector member to define at least a portion of a second document transport path of the self-service terminal when the selector member and the second deflector member are in a second position which is different from the first position.

10. A document transport path selector apparatus according to claim 9, further comprising a linking member for linking the first and second deflector members such that the first and second deflector members move together as a unit when the selector member switches between the first and second positions.

11. A document transport path selector apparatus according to claim 9, wherein the selector member is separable apart from between the first and second deflector members to allow a document which is jammed between the selector member and one of the first and second deflector members to be removed.

12. A self-service terminal comprising:

a fascia including means defining a document slot; and a document processing module including means defining a document processing zone, means defining a bi-directional document transport path which extends between the document slot and the document processing zone, and a document path selector mechanism disposed along the document transport path for (i) enabling a document to be transported along the document transport path between the document slot and the document processing zone when parts of the document path selector mechanism are in a first position, and (ii) enabling a document to be transported along a divert path extending from the document processing zone to a location other than the document slot when parts of the document path selector mechanism are in a second position;

the document path selector mechanism including first and second movable deflector members and a movable selector member disposed between the first and second deflector members such that (i) the selector member and the first deflector member co-operate to define at least a portion of the document transport path extending between the document slot and the document processing zone when parts are in the first position, and (ii) the selector member and the second deflector member co-operate to define the divert path extending from the document processing zone to the location other than the document slot when parts are in the second position;

wherein the document path selector mechanism includes a linking member for linking the first and second deflector members such that the first and second deflector members move together as a unit when parts of the document path selector mechanism switch between the first and second positions;

wherein (i) the first deflector member includes a stopping surface for engaging a surface of a first stopping member to physically limit the extent of movement of the first deflector member when parts are in the first position, and (ii) the second deflector member includes a stopping surface for engaging a surface of a second stopping member which is different from the first stopping member to physically limit the extent of movement of the second deflector member when parts are in the second position.

13. An automated teller machine (ATM) comprising:

an ATM fascia including (i) means defining a currency dispensing slot through which currency can be dispensed to an ATM customer, and (ii) means defining a cheque entrance/exit slot;

a currency dispensing module for dispensing currency via the currency dispensing slot to an ATM customer; and a cheque processing module for receiving a cheque from an ATM customer, the cheque processing module including means defining a cheque processing zone, means defining a bi-directional cheque transport path which extends between the cheque entrance/exit slot and the cheque processing zone, and a cheque path selector mechanism disposed along the cheque transport path for (i) enabling a cheque to be transported along the cheque transport path between the cheque entrance/exit slot and the cheque processing zone when parts of the cheque path selector mechanism are in a first position, and (ii) enabling a cheque to be transported along a divert path extending from the cheque processing zone to a location other than the cheque entrance/exit slot when parts of the cheque path selector mechanism are in a second position;

the cheque path selector mechanism including first and second movable deflector members and a movable selector member disposed between the first and second deflector members such that (i) the selector member and the first deflector member co-operate to define at least a portion of the cheque transport path extending between the cheque entrance/exit slot and the cheque processing zone when parts are in the first position, and (ii) the selector member and the second deflector member co-operate to define the divert path extending from the cheque processing zone to the location other than the cheque entrance/exit slot when parts are in the second position;

wherein the cheque path selector mechanism includes a linking member for linking the first and second deflector members such that the first and second deflector members move together as a unit when parts of the cheque path selector mechanism switch between the first and second positions;

wherein (i) the first deflector member includes a stopping surface for engaging a surface of a first stopping member to physically limit the extent of movement of the first deflector member when parts are in the first position, and (ii) the second deflector member includes a stopping surface for engaging a surface of a second stopping member which is different from the first stopping member to physically limit the extent of movement of the second deflector member when parts are in the second position.

14. A document path selector apparatus for use in a self-service terminal, the apparatus comprising:

first and second movable deflector members;

a movable selector member disposed between the first and second deflector members and movable between the first and second deflector members such that the selector member and the first deflector member co-operate to define at least a portion of a first document transport path of the self-service terminal when the selector member and the first deflector member are moved to a first position and the selector member and the second deflector member co-operate to define at least a portion of a second document transport path of the self-service terminal when the selector member and the second deflector member are in a second position which is different from the first position; and a linking member for linking the first and second deflector members such that the first and second deflector members move together as a unit when the selector member switches between the first and second positions;

wherein (i) the first deflector member includes a stopping surface for engaging a surface of a first stopping member to physically limit the extent of movement of the first deflector member when the selector member and the first deflector member are in the first position, and (ii) the second deflector member includes a stopping surface for engaging a surface of a second stopping member which is different from the first stopping member to physically limit the extent of movement of the second deflector member when the selector member and the second deflector member are in the second position.

* * * * *